(12) United States Patent
Falco et al.

(10) Patent No.: US 6,493,539 B1
(45) Date of Patent: Dec. 10, 2002

(54) PROVIDING AN ACCURATE TIMING SOURCE FOR LOCATING THE GEOGRAPHICAL POSITION OF A MOBILE

(75) Inventors: Steven A. Falco; Alex Matusevich; Bernard McKay, all of Morris Plains; Myles P. Murphy, Annandale; Sheng-Jen Tsai, Bridgewater, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/362,548

(22) Filed: Jul. 28, 1999

(51) Int. Cl.[7] ................................................ H04Q 7/20
(52) U.S. Cl. .................. 455/67.1; 455/422; 455/436; 455/440; 455/444; 455/502; 455/503; 370/350; 370/519
(58) Field of Search ................................ 455/503, 436, 455/437, 438, 439, 440, 444, 502, 504, 422; 370/252, 503, 507, 508, 519, 350; 432/450, 457

(56) References Cited

U.S. PATENT DOCUMENTS

| | | | | |
|---|---|---|---|---|
| 5,410,588 A | * | 4/1995 | Ito ................................ 379/58 |
| 5,633,872 A | * | 5/1997 | Dinkins ........................ 370/312 |
| 5,668,804 A | * | 9/1997 | Suonvieri ..................... 370/331 |
| 5,734,985 A | * | 3/1998 | Ito et al. ..................... 455/13.2 |
| 5,828,659 A | * | 10/1998 | Teder et al. ................. 370/328 |
| 5,854,793 A | * | 12/1998 | Dinkins ........................ 370/503 |
| 5,901,358 A | * | 5/1999 | Petty et al. .................. 455/456 |
| 6,014,376 A | * | 1/2000 | Abreu et al. ................. 370/324 |
| 6,021,330 A | * | 2/2000 | Vannucci ..................... 455/456 |
| 6,047,181 A | * | 4/2000 | Suonvieri ..................... 455/436 |
| 6,081,229 A | * | 6/2000 | Soliman et al. ......... 342/357.01 |
| 6,108,556 A | * | 8/2000 | Ito ................................ 455/422 |
| 6,125,125 A | * | 9/2000 | Narasimha et al. ......... 370/510 |
| 6,160,511 A | * | 12/2000 | Pfeil et al. ................... 342/457 |
| 6,219,347 B1 | * | 4/2001 | Uchida et al. ............... 370/347 |
| 6,223,040 B1 | * | 4/2001 | Dam ............................ 455/447 |
| 6,236,365 B1 | * | 5/2001 | LeBlanc et al. ............. 342/457 |
| 6,249,252 B1 | * | 6/2001 | Duprey ........................ 342/450 |
| 6,307,840 B1 | * | 10/2001 | Wheatley et al. ........... 370/252 |

FOREIGN PATENT DOCUMENTS

| | | |
|---|---|---|
| EP | 0 767 594 A | 4/1997 |
| WO | 98/52376 | 11/1998 |
| WO | 99/57826 | 11/1999 |

OTHER PUBLICATIONS

X.Lagrange and P. Godlewski, "Autonomous Inter Base Station Synchronisation Via a Common Broadcast Control Channel", Telecom Paris, pp. 1050–1054, © 1994.

* cited by examiner

Primary Examiner—Thanh Congle
Assistant Examiner—Yemane Woldetatios

(57) ABSTRACT

The synchronization system uses a TDMA or AMPS air interface to provide timing synchronization between previously unsynchronized base stations. The synchronization of base stations is critical between when determining the geographical position of a mobile because the geographical position is determined using a time difference of arrival method. In order to synchronize a remote base station with a serving base station, the remote base station receives a signal from the serving base station and measuring the receiving time of the signal at the remote base station in relation to the clock of the remote base station. The synchronization system determines the transmission time of the signal based on the reception time of the signal and the distance between the base stations, in relation to the clock signal of the second station, and synchronizes the clock of the remote base station to the clock of the serving base station based on the offset in the clock cycles at the time the signal was transmitted.

17 Claims, 6 Drawing Sheets

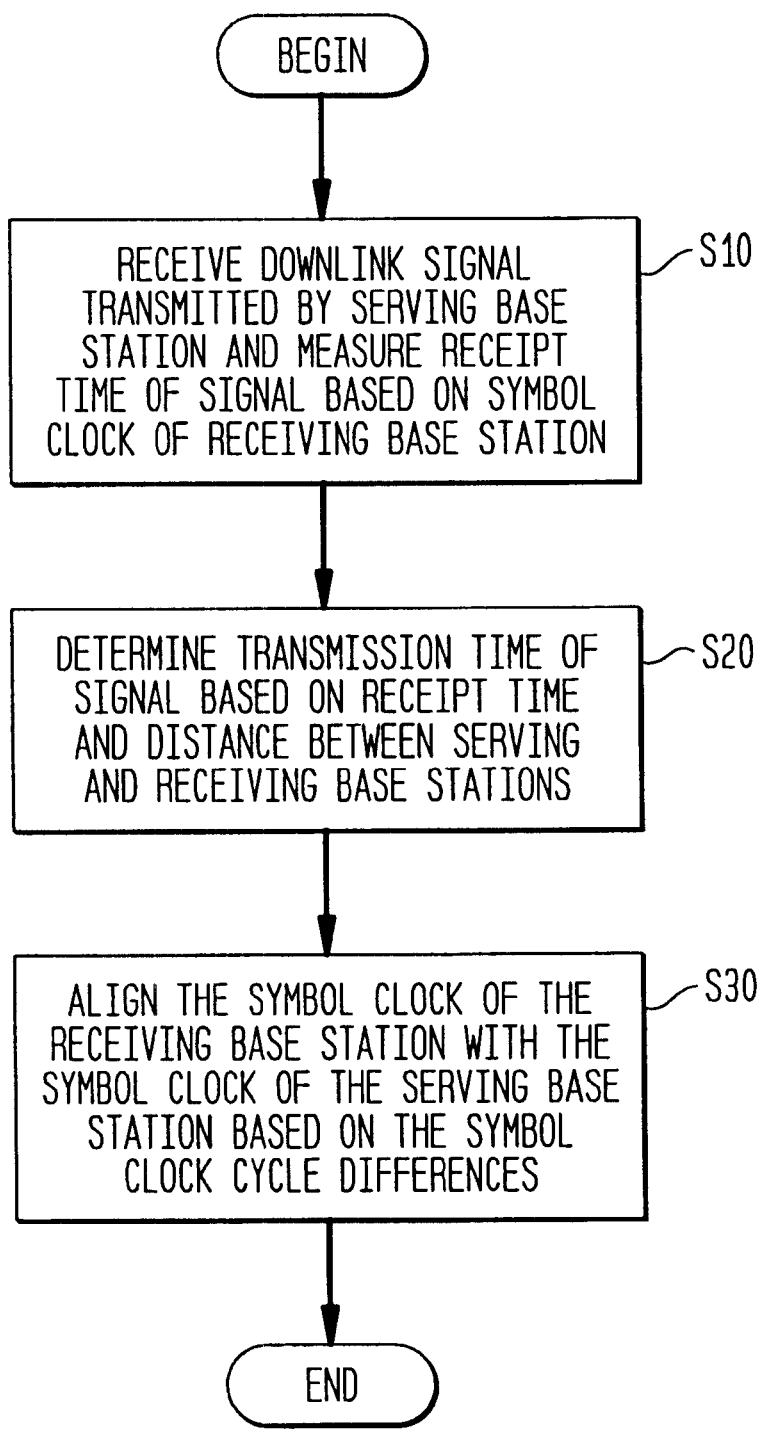

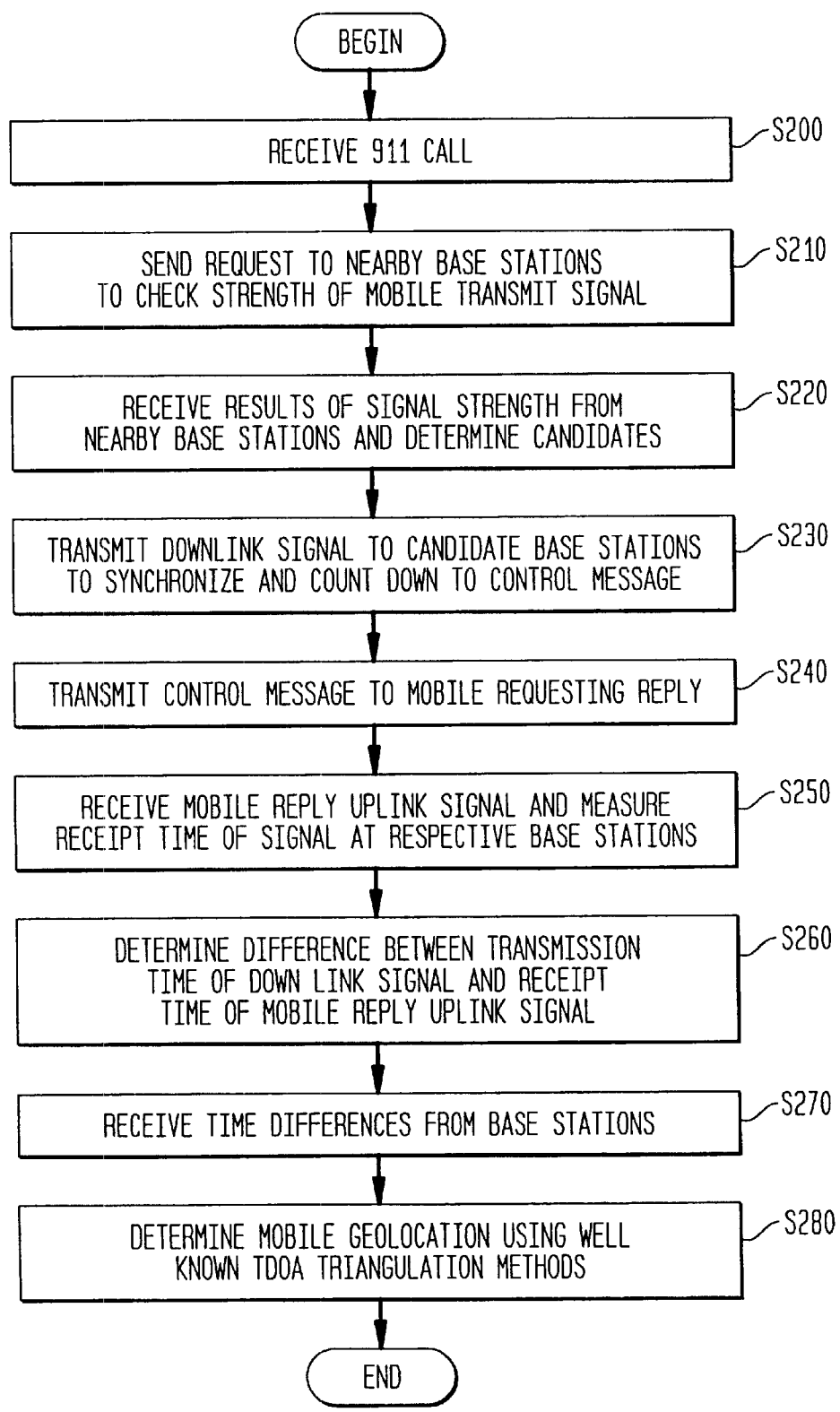

PROVIDING AN ACCURATE TIMING SOURCE FOR LOCATING THE GEOGRAPHICAL POSITION OF A MOBILE

BACKGROUND OF THE INVENTION

1. Field of the Invention

The present invention relates to a method for communicating between base stations and mobiles to provide an accurate timing source between unsynchronized base stations and more particularly to a method for communicating between base stations and mobiles to provide an accurate timing source between unsynchronized base stations in a wireless TDMA or AMPS system.

2. Description of Related Art

The increased popularity of wireless telephony including cellular, enhanced specialized mobile radio (ESMR) and personal communication services (PCS), has resulted in a surge in wireless calls to 911. Public safety agencies strive to provide the same level of service to cellular callers as for land line callers, but they are hampered by significant technological diversity. Enhanced 911 systems were designed and constructed to support land lines telephones. Land lines telephones are connected via fixed wires back to Telco Central Offices (TCOs), and thus there is a permanent relationship between the telephone and its location. When someone places a 911 call from a land line telephone, the location of the phone is used to determine the closest police, fire, medical agency and public safety answering point (PSAP). Having this detailed operation at the operator's fingertips enables the rapid response for which 911 systems are known.

However, wireless callers are not associated with any location, which is why they are so popular. This benefits works against a wireless telephone or mobile use that requires emergency assistance. When a caller's geographic location is unknown, an operator must spend valuable time at the start of the call obtaining basic information about the location and area police, fire, medical agencies and PSAPs before fully understanding the nature of the emergency. Therefore, a quick determination of a caller's location can be crucial for a person's safety.

Wireless telephone base stations with mobile location systems are being considered to determine the geolocation of a mobile. Since the advent of radar, high accuracy location systems have used time difference of arrival (TDOA) methods as a preferred technology for location determination. In fact, the Global Positioning System (GPS) is a TDOA based system as are most of the systems proposed for the location and monitoring service being allocated by the FCC. TDOA systems operate by placing location receivers at multiple base stations geographically disbursed in a wide area. When a signal is transmitted from a mobile, the signal propagates at approximately a thousand feet per second to local base stations, where the signal reception is time stamped. The differences in time stamps are then compared using well known triangulation methods to produce intersecting hyperbolic lines from which the location is estimated.

However, TDOA methods require the base stations used in the triangulation methods to be accurately aligned in time. In other words, the base stations must be synchronized. Currently in TDMA and AMPS wireless systems, external equipment must be added to all of the individual base stations to provide the required timing accuracy and synchronization.

CDMA is a very different technology than TDMA or AMPS. CDMA has an N=1 frequency reuse plan where the same frequency spectrum is used by neighbor cells (to increase capacity). The synchronization of CDMA cells allows digitally coded voice data to be seamlessly handed off to a neighbor cell. TDMA has an N=7 frequency reuse plan and the individual 30 kHz frequency channels are not reused by adjacent cells but reused by cells far enough away to minimize co-channel interference.

Therefore, it is desirable to provide a method to provide timing synchronization between base stations in TDMA and AMPS systems without the implementation of expensive external equipment.

SUMMARY OF THE INVENTION

The present invention improves upon conventional TDMA and AMPS systems by providing an approach to use a TDMA/AMPS air interface to provide timing synchronization between unsynchronized base stations. This is accomplished in a preferred embodiment by marking time stamps of signals arriving at predetermined or candidate base stations from a serving base station. The time stamps are marked in relation to a clock signal of the respective candidate base station. The respective candidate base station becomes synchronized with the serving base station based on a down link offset calculated at each candidate base station that represents the fractional symbol time, relative to the internal symbol clock of the respective candidate base station, between the time the signal is transmitted from the serving base station to a next predetermined cyclical point of the symbol clock of the candidate base station. The predetermined cyclical point may be, for example, at the beginning of the next cycle when clock goes high. The respective candidate base station determines the time the signal was transmitted based on the time the signal is received at the candidate base station and the known time required for the signal to travel from the serving base station to the candidate base station.

Since the serving base station transmits the signal at a known point of its symbol clock cycle, for example the beginning of a clock cycle, the candidate base station can synchronize its internal symbol clock to the internal symbol clock of the serving base station. The synchronization is established by aligning the calculated down link symbol offset to correspond to the signal transmission time at the serving base station.

Although the internal symbol clocks of the base stations are not synchronized, they do operate at the same frequency based on the accurate and conventional T1 link clock. In other words, each clock operates at a frequency of about 1.544 MHz plus or minus 75 Hz. Accordingly, base station symbol clocks maintain approximately the same relationship in alignment to other base station symbol clocks. Therefore, two base stations that are in sync will remain synchronized for subsequent communication. When base stations are in sync, it is possible to perform operations that require synchronized stations, such as TDOA information used for determining the location of a mobile. Therefore, this invention provides a method for synchronizing base stations such that a mobile's location can be determined using conventional TDOA methods.

Determining a mobile's position provides a greater benefit than the application of emergency management from 911 calls. Other applications, such as fraud management, location sensitive billing, vehicle and fleet management, inventory/package monitoring, and wireless system design would also become available to TDMA and AMPS systems without severe hardware implementation costs.

In a preferred embodiment, the synchronization system is a software implementation on a computer used to determine the geographic location of the mobile. The software implementation receives a time stamp of receipt of a first signal transmitted from the serving base station to a candidate base station. The time stamp is measured in relation to the symbol clock of the candidate base station. The synchronization system determines the time the signal was transmitted from the serving base station, as a transmission time stamp, based on the receiving time stamp of the signal and the known distance between the serving base station and candidate base station. This transmission time stamp is measured in relation to the symbol clock of the candidate base station. The synchronization system then synchronizes the symbol clock of the candidate base station to the symbol clock of the serving base station by aligning the determined transmission time stamp of the signal to the known point of the serving base station symbol clock cycle that represents the actual transmission time stamp from the serving base station.

BRIEF DESCRIPTION OF THE DRAWINGS

The invention will be described in detail with reference to the following drawings, wherein like numerals represent like elements and:

FIG. 2($b$) is a schematic perspective view of the synchronization system implementation according to another preferred embodiment of the invention;

FIG. 3 illustrates a flow chart of a preferred embodiment of the synchronization system;

FIG. 6 illustrates a flow chart of yet another preferred embodiment of the synchronization system.

DETAILED DESCRIPTION OF THE INVENTION

The present invention is directed to a synchronization system for a method of using a TDMA air interface to provide timing synchronization between base stations involved with a mobile locate without the use of expensive external base station equipment. The system and method support TDMA and AMPS communication systems and meets current distance and response time requirements of 911 using existing base station hardware. Although the embodiments described herein are used in a TDMA communication system, it is understood that the embodiment are also applicable to an AMPS communication system as described below.

Figure 1:
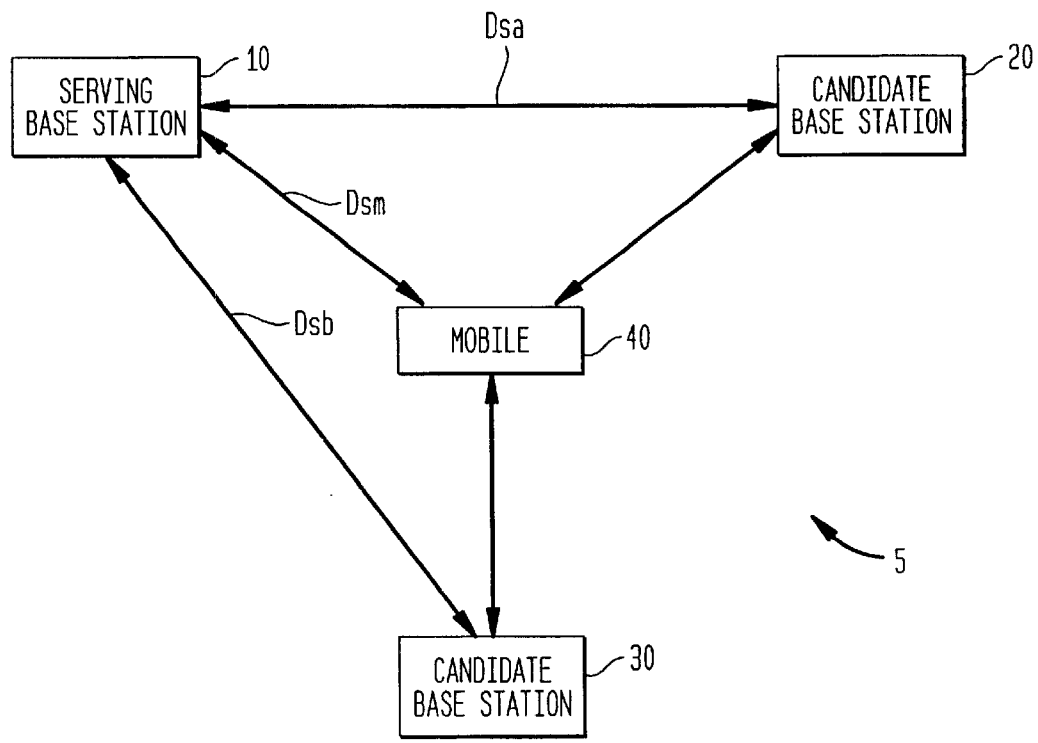
FIG. 1 is a block diagram illustrating the basic components of a conventional TDMA/AMPS wireless system.

One embodiment of the approach for synchronizing a communication station to another communication station is shown, for example, at FIG. 1. As shown, FIG. 1 illustrates a conventional TDMA wireless system 5 including a serving base station 10, a candidate base station 20, a candidate base station 30, and a mobile 40. The serving base station 10 is separated from the candidate base station 20 by a known distance $D_{sa}$, and is separated from the candidate base station 30 by the known distance $D_{sb}$. The mobile 40 is located between the base stations 10, 20 and 30 and communicates with the base stations 10, 20 and 30 via communication channels over which signals modulated with data and codes are transmitted.

Figure 2A:
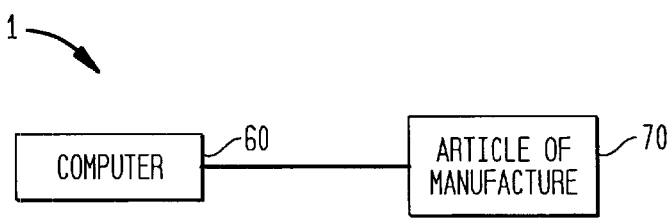
FIG. 2($a$) is a schematic perspective view of the synchronization system implementation according to a preferred embodiment of the invention.
Figure 2B:
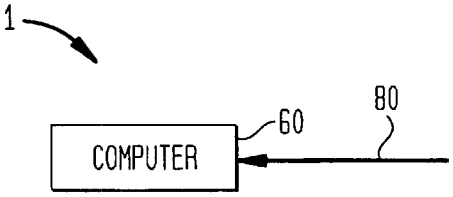

FIG. 2($a$) illustrates a diagram of a synchronization system implementation. The synchronization system 1 includes a computer 60, an article of manufacture 70 and is preferably located at the serving base station 10 or at another location that can communicate in real-time with a receiver or transmitter of the serving base station 10. Therefore, the synchronization system 1 may be located at one of the candidate base stations 20, 30 or another location communicatively connected to the serving base station 10. The article of manufacture 70 includes a computer-readable medium and an executable program for synchronizing the candidate base stations 20, 30 to the serving base station 10 and for locating the mobile 40.

FIG. 2($b$) illustrates an alternative synchronization system implementation. The synchronization system 1 includes the computer 60 for receiving a signal 80 carrying the executable program for synchronizing the candidate base stations 20, 30 to the serving base station 10. The signal 80 is transmitted in a digital format either with or without a carrier wave.

Preferred embodiments of the invention will be described in the following order. First, an approach to synchronize a candidate base station 20, 30 to the serving base station 10 will be explained while referring to FIGS. 3 and 4. Then, an approach for measuring the time between a transmission event from the serving base station 10 and receipt of a subsequent event will be explained while referring to FIGS. 4 and 5. Last, an approach for gathering time differences for different candidate base stations 20, 30 for locating the mobile 40 will be explained while referring to FIGS. 4 and 6.

FIG. 3 illustrates a flow chart for synchronizing a candidate base station 20, 30 to a serving base station 10 from the perspective of the respective candidate base station 20, 30. The serving base station 10 sends a down link "event" with a time stamp embedded in unused data symbols of the frame. The "event" for TDMA is, for example, a point in time when a phase change occurs between symbols in the transmit. At S10, the candidate base station 20, 30 receives the down link event and measures the time stamp embedded in the "event". The candidate base station 20, 30 measures the receipt time based on the symbol clock of the respective candidate base station 20, 30.

Figure 4:
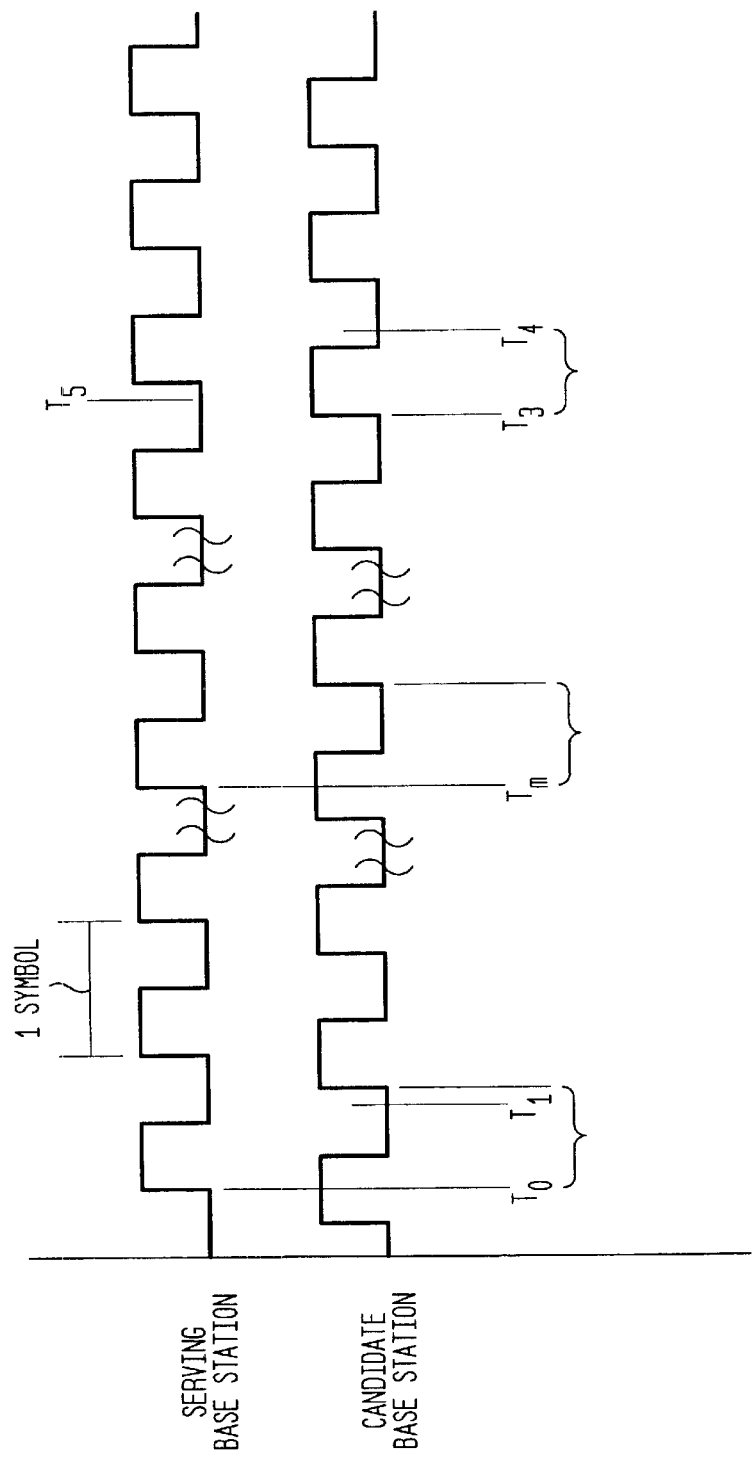
FIG. 4 is a timing chart illustrating an example synchronization of internal symbol clocks from different base stations in accordance with a preferred embodiment of the invention.

FIG. 4 illustrates an example timing chart of an internal symbol clock of the serving base station 10 and a candidate base station 20, 30. As shown, the serving base station 10 transmits the down link "event" at transmission time $T_0$, which is received at the candidate base station 20, 30 at the down link reception time $T_1$, as described in step S10 of FIG. 3. The receiving time of the down link "event" reception time $T_1$ is shown at FIG. 4 relative to the symbol clock of the respective candidate base station 20, 30.

At step S20 of FIG. 3, the synchronization system 1 determines the transmission time $T_0$ of the down link "event" in relation to the symbol clock of the candidate base station 20, 30. The down link transmission time $T_0$ is determined based on the time $T_1$ that the transmission is received at the candidate base station 20, 30, and the known distance between the serving base station 10 and the respective receiving base station 20, 30. In other words, the down link transmission time $T_0$ is equal to the down link reception time $T_1$, minus the time for the down link signal to travel from the serving base station 10 to the candidate base station 20, 30. Assuming a line of sight signal path, the travel time of the signal is equal to the distance between the serving and candidate base stations divided by the wavespeed of the signal.

At step S30 of FIG. 3 the synchronization system 1 aligns the symbol clock of the candidate base station 20, 30 to the serving base station 10 according to the symbol clock differences. The serving base station 10 transmits its down link "event" at time $T_0$, for example, when a phase change occurs between symbols in the transit. As shown at FIG. 4, the transmission time $T_0$ for the phase change occurs when the symbol clock goes high. The down link transmission time $T_0$ determined by the serving base station 10 is marked on the symbol clock of the candidate base station 20, 30, and is aligned with the known point in time when the serving base station 10 sends the down link "event". The synchronization system 1 determines a down link offset $D_0$ as the time between the transmission time $T_0$ and the beginning of a next symbol clock cycle at the candidate base station 20, 30. Accordingly, the down link offset $D_0$ represents the symbol offset between the clocks of the serving base station 10 and the respective candidate base station 20, 30.

Thus the symbol clock of the candidate base station 20, 30 is synchronized with the symbol clock of the serving base station 10 because any point on the symbol clock of the serving base station 10 corresponds to a similar point on the symbol clock of the candidate base station 20,30 shifted by the down link offset $D_0$. Accordingly, by aligning the predetermined time of the symbol clock at the serving base station 10 with the calculated down link transmission time $T_0$ the candidate base station 20, 30 is synchronized with the serving base station 10.

Next, an approach for measuring the time between a transmission event from the serving base station 10 and receipt of a subsequent event will be explained with references to FIGS. 4 and 5. Once the candidate base station 20 or 30 is synchronized with the serving base station 10 based on the down link offset $D_0$, subsequent "events" are also synchronized. That is, a subsequent time stamp received at the candidate base station 20, 30 can be measured from a known point on the symbol clock of the serving base station 10. Therefore, a subsequent signal can be received by the candidate base station 20, 30, and the synchronization system can determine a time difference between the time of the transmission down link $T_0$ and the receipt of the subsequent signal.

Figure 5:
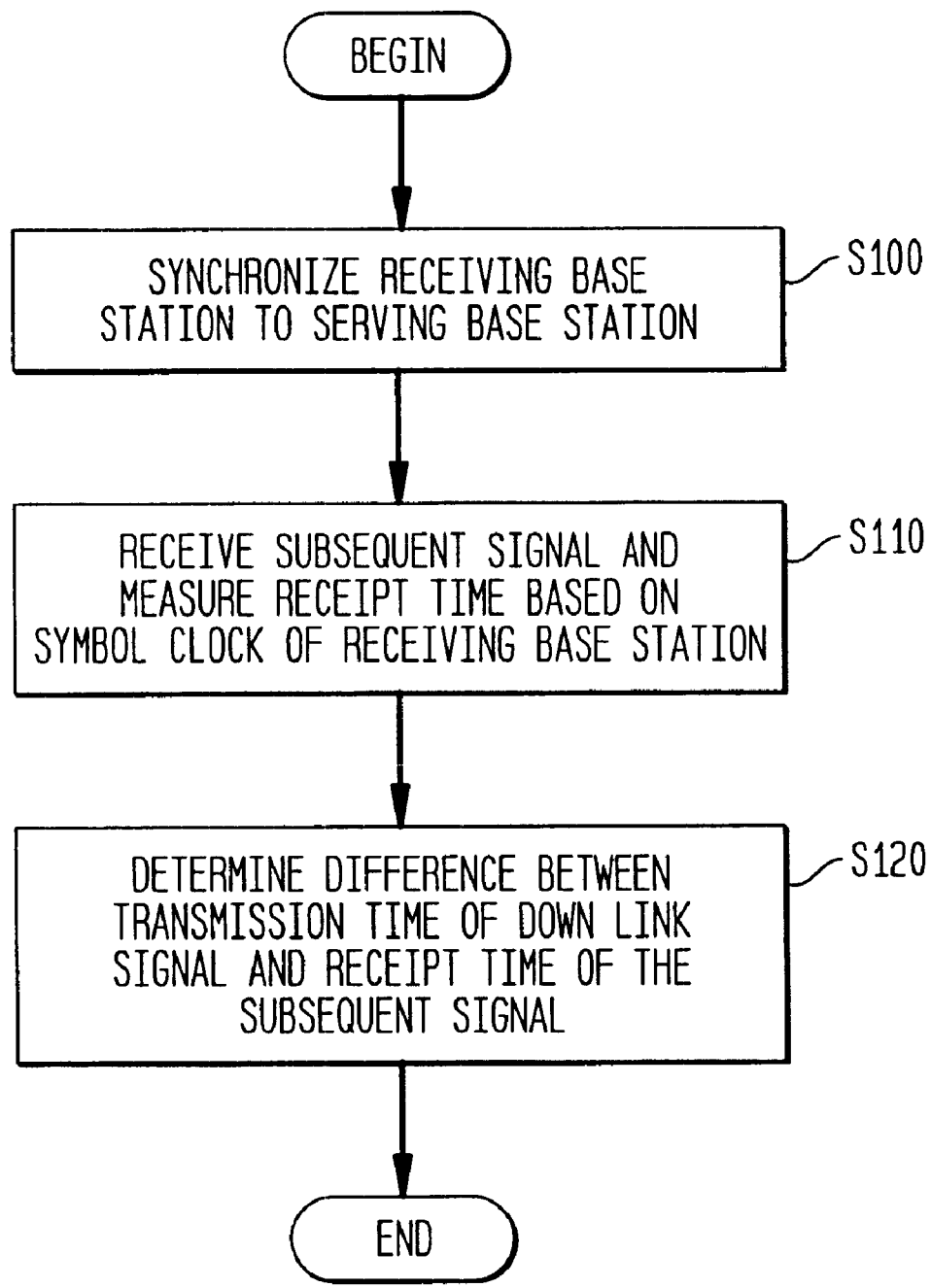
FIG. 5 illustrates a flow chart of another preferred embodiment of the synchronization system.

FIG. 5 illustrates an example flow chart of another preferred embodiment of synchronization system 1. In this preferred embodiment, at step S100, the synchronization system 1 synchronizes a receiving base station 20, 30 to a serving base station 10 as discussed above and shown at FIG. 3 for steps S10, S20 and S30. After the synchronization system 1 synchronizes the candidate base station 20, 30, the respective candidate base station 20, 30 receives a subsequent signal at step S110. This subsequent signal can originate from any transmitting source, such as the mobile 40, the serving base station 10, or another candidate base station 20, 30. The candidate base station 20, 30 measures the receipt time of the subsequent signal in relation to the symbol clock of the receiving candidate base station 20, 30.

After the candidate base station 20, 30 receives a down link message from the serving base station 10 and synchronizes the respective candidate base stations 20, 30 to the serving base station 10, at S100, a transmitting source such as the mobile 40 sends an uplink "event" in response to the control message. The uplink "event" is, for example, a phase change that occurs between known symbols in the transmit. The serving base station 10 and candidate base stations 20, 30 receive the uplink "event" and measure the receipt time of the uplink "event" based on the symbol clock of the respective base station 10, 20 and 30. Since the candidate base stations 20, 30 have been synchronized with the serving base station 10 at step S100, the synchronization system 1 can determine at step S120 a difference between the transmission time $T_0$ of the down link "event" transmitted from the serving base station 10 and the receipt time $T_4$ of the uplink "event" transmitted from the mobile 40 and received at the respective candidate station 20, 30. Of course, the synchronization system 1 can also determine at step S120 the difference between the transmission time $T_0$ of the down link "event" transmitted from the serving base station 10 and the receipt time $T_5$ of the uplink "event" transmitted from the mobile 40 and received back at the serving base station 10. The difference in time is reported as the sum of the down link offset $D_0$—the time from time $T_0$ to the beginning or rise time of the next symbol—plus an uplink offset $U_0$, described below, plus the number of symbols between the down link offset $D_0$ and the uplink offset $U_0$.

FIG. 4 also illustrates an example uplink offset $U_0$ of an uplink "event" received by a candidate base station 20, 30. As discussed above, at step S110 of FIG. 5, the candidate base station 20, 30 receives the uplink "event" at $T_4$ in relation to the candidate symbol clock. The synchronization system 1 then measures the time interval between $T_4$ and the most recent rise time of the symbol clock, time $T_3$. The uplink offset $U_0$ is then determined as the fractional part of a symbol clock relative to the internal symbol clock of the respective candidate base station 20, 30 from the beginning of the last symbol clock rise time $T_3$ to the uplink "event" receipt $T_4$. Therefore, the synchronization system 1 measures the total time between the transmission time $T_0$ of a down link "event" from the serving base station 10 to the receipt time of an uplink "event" received at the candidate base station 20, 30 as the sum of the down link offset $D_0$, the uplink offset $U_0$ and the number of symbols therebetween.

Next, an approach for gathering time differences from different candidate base stations 20, 30 for locating the mobile 40 will be explained with reference to FIGS. 4 and 6. The embodiment describes a method for providing an accurate timing source for locating a geographic position of a mobile 40 placing a 911 call.

At step S200 of FIG. 6, the serving base station 10 receives a "911" call. The call is transmitted by the mobile 40 on a reverse channel and triggers the base station 10 to locate the mobile 40, for example as discussed below. In response to the 911 call, the serving base station 10 transmits a geo-locate request to neighboring base stations local to the serving base station 10. The geo-locate request is embedded in T1 control messages and is transmitted via an executive control processor (ECP) at the switch in the PSTN.

Based on the geo-locate request, the neighboring base stations check the signal quality of the transmit signal sent from the mobile 40, and sends the signal quality level back to the serving base station 10 through the ECP. Upon receipt of the resulting signals, at step S220, the serving base station 10 determines which neighboring base stations are good candidates for a geo-location of the mobile 40. The neighboring base stations that received the transmit signals from the mobile 40 with a signal quality that is sufficiently high are assigned to be candidate base stations 20, 30 and are used to gather TDOA information, as described below.

Figure 7A:
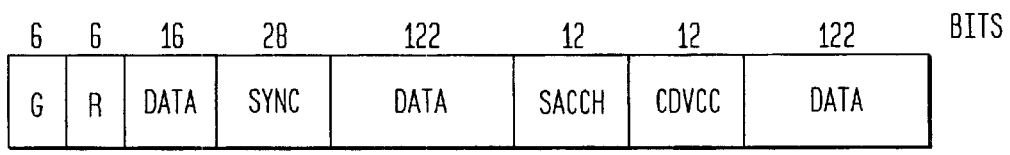
FIGS. 7($a$) and 7($b$) illustrate an exemplary message format in a preferred embodiment of the synchronization system.
Figure 7B:
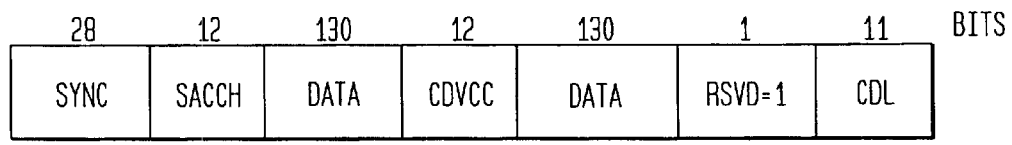

At step S230, the serving base station transmits a down link message to the mobile that is also received by the candidate base stations 20, 30. In a preferred embodiment, as illustrated in FIGS. 7(a) and 7(b), an IS 136A message format is utilized. FIG. 7(a) illustrates the slot format for mobile station to base station messaging and FIG. 7(b) illustrates the slot format for base station to mobile station messaging. Slot G represents guard time, slot R represents ramp time, DATA represents user information or FACCH, SACCH represents slow associated control channel, CDVCC represents coded digital verification color code, SYNC represents synchronization in training, CDL represents coded digital control channel locator, and RSVD represent reserved. In the present embodiment, commands can be sent during the SACCH interval of the down linked message.

The candidate base stations 20, 30 then synchronize their internal symbol clock with the internal symbol clock of the serving base station 10 in the manner described above at steps S10 to S30 of FIG. 3.

The down link message also informs the respective candidate base stations 20, 30 that the serving base station 10 will transmit a control message to the mobile 40. That is, embedded in the down link message is an instruction informing the candidate base stations 20, 30 that the serving base station 10 will transmit a control message to the mobile 40 at a specific time, such as a number of symbol clock cycles from the transmission of the down link message transmitted to the candidate base station 20, 30. For example, embedded in the down link message is an instruction informing the candidate base station 20, 30 that the serving base station 10 will transmit a control message to the mobile 40 at time $T_m$, as shown in FIG. 4.

The candidate base stations 20, 30, which have been synchronized with the serving base station 10, count down to the specific time that the down link message indicates as when the serving base station 10 will transmit the mobile control message, and then starts counting from that specific time $T_m$. At step S240 of FIG. 6, the serving base station 10 transmits the mobile control message. The mobile control message instructs the mobile 40 to transmit an uplink "event" which, for example as described above, is a symbol phase change occurrence in TDMA. Accordingly, the mobile 40 receives the mobile control message from the serving base station 10 and transmits a reply uplink "event" to the base stations 10, 20 and 30. At step S250, the base stations 10, 20, 30 receive the reply uplink "event" and measure the receipt time of the reply uplink "event" in a manner similar to step S110 described above for FIG. 5.

At step S260 of FIG. 6, the base stations 10, 20 and 30 determine the time difference between the transmission time of the mobile control message sent from the serving base station 10 and the receipt time of the mobile 40 uplink "event" received at the respective base station 10, 20 and 30. The differences for the candidate base stations 20 and 30 are determined in a manner similar to the approach discussed above for step S120 in FIG. 5. In this embodiment, the difference between the transition time of the mobile control message from the serving base station 10 and the receipt time of the mobile uplink "event" is determined as the sum of the down link offset $D_0$, the uplink offset $U_0$ and the number of integer symbol counts at the respective serving base station 20 and 30 that have transpired between the time $T_m$ and the uplink offset $U_0$.

It is understood that this time difference should not include delays that are unique to each base station 20, 30. These delays include a group delay of the candidate base station 20 and 30 receiver path, and a delay due to the distance between the serving base station 10 and the candidate base station 20 and 30. However, both these delays are known or can readily be determined. The group delay is the delay of the signal as it passes through base station receiver circuitry, base station transmit circuitry, or mobile receive or transmit circuitry. The group delay is a constant value but must be measured for each base station. The delay between the base station and the candidate base station is due to the distance that the RF signal travels, in nanosecond per foot.

The time difference between the transmission time of a signal from the serving base station 10 and the receipt time of the mobile 40 uplink "event" at the serving base station 10 is determined in a manner similar to the approaches discussed above at steps S120 and S260 for the candidate base stations 20 and 30. However, because the serving base station 10 is synchronized with itself, and its down link "event" and mobile control message are transmitted from the serving base station 10 at the beginning of a symbol clock cycle, there is no down link offset $D_0$. Therefore, the time difference at step S260 for the serving base station 10 is equal to the sum of the number of integer internal symbol counts at the serving base station 10 that have transpired between the transmission of the mobile control message at time $T_m$ and receipt of the uplink "event" at time $T_5$, and the uplink offset $U_0$ which is the fractional part of a symbol time from the previous whole symbol to the uplink "event" receipt time $T_5$.

As described above for the candidate base stations 20 and 30, known group delays are then subtracted from the sum to arrive at a time difference consistent with the time difference as determined for the candidate base stations 20 and 30. For the serving base station 10, the delays include a group delay of the receiver at the serving base station 10 from the actual time of receipt of the uplink "event" at the receiver to the recording time of the time stamp. Another delay at the serving base station 10 is the transmitter group delay measured as the difference in time between receipt of an instruction to transmit a signal and the actual time of the transmission. As noted above, these counts are known or can be readily determined.

As shown in FIG. 6, after the time differences between the transmission time $T_4$ the mobile control message and the receipt time $T_m$ of the mobile uplink "event" are determined at step S260, the candidate base stations 20 and 30 transmit the time differences to the serving base station 10. At step S270, the serving base station 10 receives the time differences from the candidate base stations 20, 30. At step S280, a computer located, for example, at the serving base station 10 uses TDOA to determine the position of the mobile 40 based on the time differences. The TDOA technology used to determine the position of the mobile 40 is well known and is based on the difference in time between when the base stations 10, 20 and 30 receive the uplink "event".

It is also understood that a delay exist in the mobile 40 between when the mobile 40 receives the mobile control message and when the mobile 40 transmits the "event". However, this mobile delay is identical for each of the determined time differences, and is therefore cancelled out where the time differences from one of the base stations 10, 20 and 30 are compared to another of the base stations 10, 20 and 30.

The above embodiments are described in relation to a TDMA system. For an AMPS system, the approach is basically identical. The relevant difference between the approaches is that the uplink "event" transmitted by the mobile 40 is an AMPS event instead of a TDMA event. Accordingly, the uplink "event" is measured by, for example, receipt of a mobile identification number included in the uplink signal. The mobile identification number is located at a predetermined point in the transmission string of the "event" data transmitted on the reverse channel.

While this invention has been described in connection with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A method for synchronizing a first base station and a second base station, comprising:
   (a) receiving a first signal from the first base station, the first base station having a clock signal unsynchronized with a clock signal of the second base station;
   (b) measuring a receiving time of the first signal in relation to the clock signal of the second base station;
   (c) determining a transmission time of the first signal based on the measured receiving time of the first signal and a distance between the first base station and the second base station, in relation to the clock signal of the second base station; and
   (d) synchronizing the clock signal of the second base station to the clock signal of the first base station based on a signal cycle difference between the clock signals at the transmission time.

2. The method of claim 1, further comprising:
   (e) receiving a second signal;
   (f) measuring a receiving time of the second signal in relation to the clock signal of the second station; and
   (g) determining the difference between the transmission time of the first signal and the receiving time of the second signal.

3. The method of claim 2, wherein the second signal is received from a source other than the first station.

4. The method of claim 1, further comprising:
   (e) measuring a predetermined time based on the first signal in relation to the clock signal of the second station;
   (f) receiving a second signal;
   (g) measuring a receiving time of the second signal in relation to the clock signal of the second station; and
   (h) determining a difference between the predetermined time and the receiving time of the second signal.

5. The method of claim 4, wherein the predetermined time is indicative of a time when the first station transmits a control message.

6. The method of claim 4, wherein the second signal is received from a source other than the first station.

7. A method for synchronizing a first base station and a plurality of second base stations, comprising:
   (a) transmitting a down link message to the second base stations to synchronize a symbol clock of each of the second base stations to a symbol clock of the first base station;
   (b) transmitting a control message to the mobile at a predetermined time, the control message requesting a reply message from the mobile;
   (c) receiving the reply message from the mobile and measuring a time that the reply message was received at the first base station as a first base station receiving time;
   (d) determining a difference between the predetermined time and the first base station receiving time as a first base station time difference; and
   (e) receiving messages from the second base stations representing a difference between the predetermined time and a time that the reply message was received at each second base station as a plurality of second base station time differences, so a location of the mobile can be determined.

8. The method of claim 7, prior to step (a), further comprising:
   (x) transmitting a request message to a plurality of nearby stations to determine a strength of a signal originating from a mobile;
   (y) receiving response messages from the nearby stations indicating the strength of the signal originating from the mobile; and
   (z) determining the nearby stations having the strength greater than a predetermined amount as the second stations.

9. The method of claim 7, prior to step (a), further comprising:
   (z) receiving one of a 911 call and a mobile locate call as a mobile locate request,
   wherein step (a) transmits the down link message to the second stations based on the mobile locate request.

10. The method of claim 7, wherein the down link message informs the second station of the predetermined time when the control message is transmitted.

11. A synchronization system implemented on a computer, comprising:
   means for receiving a first signal from the first base station, the first base station having a clock signal unsynchronized with a clock signal of the second base station;
   means for measuring a receiving time of the first signal in relation to the clock signal of the second base station;
   means for determining a transmission time of the first signal based on the measured receiving time of the first signal and a distance between the first base station and the second base station, in relation to the clock signal of the second base station; and
   means for synchronizing the clock signal of the second base station to the clock signal of the first base station based on a signal cycle difference between the clock signals at the transmission time.

12. The synchronization system of claim 11, further comprising:
   subsequent means for receiving a second signal;
   subsequent means for measuring a receiving time of the second signal in relation to the clock signal of the second station; and
   subsequent means for determining the difference between the transmission time of the first signal and the receiving time of the second signal.

13. The synchronization system of claim 11, wherein the second signal is received from a source other than the first station.

14. The synchronization system of claim 11, further comprising:
   first subsequent means for measuring a predetermined time based on the first signal in relation to the clock signal of the second station;

subsequent means for receiving a second signal;

second subsequent means for measuring a receiving time of the second signal in relation to the clock signal of the second station; and subsequent means for determining a difference between the predetermined time and the receiving time of the second signal.

15. The synchronization system of claim 14, wherein the predetermined time is indicative of a time when the first station transmits a control message.

16. An executable program embodied on a computer-readable medium for synchronizing a first base station and a second base station, comprising:

a receiving source code segment for receiving a first signal from the first base station, the first base station having a clock signal unsynchronized with a clock signal of the second base station;

a measuring source code segment for measuring a receiving time of the first signal in relation to the clock signal of the second base station;

a determining source code segment for determining a transmission time of the first signal based on the measured receiving time of the first signal and a distance between the first base station and the second base station, in relation to the clock signal of the second base station; and a synchronizing source code segment for synchronizing the clock signal of the second base station to the clock signal of the first base station based on a signal cycle difference between the clock signals at the transmission time.

17. A computer data signal, comprising:

a receiving signal segment for receiving a first signal from the first base station, the first base station having a clock signal unsynchronized with a clock signal of the second base station;

a measuring signal segment for measuring a receiving time of the first signal in relation to the clock signal of the second base station;

a determining signal segment for determining a transmission time of the first signal based on the measured receiving time of the first signal and a distance between the first base station and the second base station, in relation to the clock signal of the second base station; and a synchronizing signal segment for synchronizing the clock signal of the second base station to the clock signal of the first base station based on a signal cycle difference between the clock signals at the transmission time.

* * * * *